United States Patent [19]
O'Neill, Jr.

[11] 3,905,442
[45] Sept. 16, 1975

[54] ELECTRICALLY DRIVEN ASSIST UNIT FOR RIDER PROPELLED VEHICLES

[75] Inventor: Joseph P. O'Neill, Jr., Deptford, N.J.

[73] Assignee: General Engines Co., Inc., Thorofare, N.J.

[22] Filed: Aug. 21, 1974

[21] Appl. No.: 499,274

[52] U.S. Cl............... 180/33 D; 180/34; 180/65 A; 180/74; 74/207
[51] Int. Cl.² .................. B62D 61/02; B62D 61/08; B60K 1/00; B60K 17/14
[58] Field of Search............ 180/33 D, 33 C, 31, 34, 180/74, 26 R, 65 A; 74/207, 209

[56] References Cited
UNITED STATES PATENTS

| | | | |
|---|---|---|---|
| 2,586,082 | 2/1952 | Piatti | 180/33 D |
| 2,601,342 | 6/1952 | Starts | 180/33 D |
| 3,431,994 | 3/1969 | Wood, Jr. | 180/74 X |
| 3,439,926 | 4/1969 | Bayard | 180/74 X |
| 3,773,131 | 11/1973 | Jaulmes | 180/33 C X |
| 3,841,428 | 10/1974 | Bialek | 180/74 |

FOREIGN PATENTS OR APPLICATIONS

| | | | |
|---|---|---|---|
| 653,158 | 5/1951 | United Kingdom | 180/33 D |
| 654,325 | 12/1948 | United Kingdom | 180/33 D |

*Primary Examiner*—David Schonberg
*Assistant Examiner*—John P. Silverstrim
*Attorney, Agent, or Firm*—John N. Randolph

[57] ABSTRACT

An electrically driven assist unit for rider propelled vehicles, such as bicycles and tricycles, including a friction wheel driven by an electric motor and which propels the vehicle by frictional engagement with the front wheel tire. A control unit, which is manually actuated by a gripping force applied to a lever, initially moves the electric motor downwardly to engage the friction wheel with the tread surface of the tire and thereafter closes an electric circuit to the electric motor for driving the friction wheel and, at the same time, for moving the friction wheel into tighter engagement with the tire. A return spring raises the friction wheel out of engagement with the tire when the gripping pressure is released from the hand lever, and a second spring displaces a movable switch contact out of engagement with a stationary contact for interrupting the electric circuit to the motor.

9 Claims, 9 Drawing Figures

PATENTED SEP 16 1975 3,905,442

ELECTRICALLY DRIVEN ASSIST UNIT FOR RIDER PROPELLED VEHICLES

SUMMARY

It is a primary object of the present invention to provide a novel electrical assist unit for rider propelled vehicles, such as bicycles and tricycles, which may be readily operated by the vehicle rider for propelling the vehicle, or for augmenting the manual propulsion thereof, as when riding up a steep incline, and which may be disengaged and rendered inoperative, as when coasting down hills.

More particularly, it is an object of the invention to provide a unique control which may be manipulated by grasping a hand lever, mounted on the vehicle handlebar, and by exerting a gripping force on said lever and a handgrip of the handlebar, an electrically driven friction wheel may be brought into contact with the tread of the tire of one of the wheels of the vehicle and a circuit thereafter closed to an electric motor, for driving said friction wheel for propelling the vehicle by a friction drive.

A further object of the invention is to provide such a device of light weight construction which may be readily mounted on the front wheel fork of the vehicle and which will not in any way interfere or impede normal manual propulsion of the vehicle, so long as a hand lever of the control unit is not gripped or squeezed by the rider.

Still a further object of the invention is to provide such a propulsion unit having a control means to exert a pulling force on a flexible element when a hand lever is rocked, pushed or swung toward a handgrip of the handlebar, for initially swinging the friction wheel into engagement with the tire tread and for thereafter closing an electric circuit to a motor which drives the friction wheel and for simultaneously tightening the frictional engagement of the friction wheel with the tire.

Still a further object of the invention is to provide an electric drive wherein release of the hand lever will result in the friction wheel being swung out of engagement with the tire tread and the electric circuit to the motor being interrupted.

Various other objects and advantages of the invention will hereinafter become more fully apparent from the following description of the drawings, illustrating a presently preferred embodiment thereof, and wherein:

DESCRIPTION OF THE PREFERRED EMBODIMENT

Figure 1:
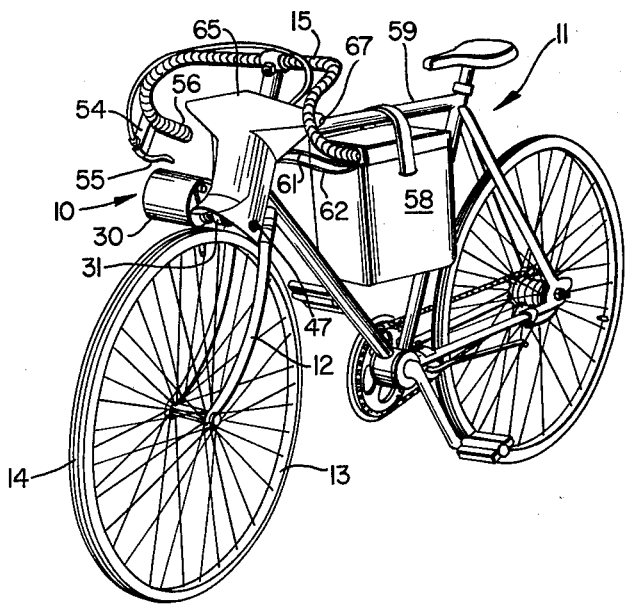
FIG. 1 is a perspective view showing the electrically driven assist unit mounted on a bicycle.

Referring more specifically to the drawings, the assist unit in its entirety and comprising the invention is designated generally 10 and is illustrated in the drawings applied to a conventional bicycle 11 having a front fork 12, a front wheel 13, rotatively mounted in said fork, a tire 14, mounted on the wheel 13, and a handlebar 15 by which the front wheel 13 is steered in a conventional manner.

Figure 5:
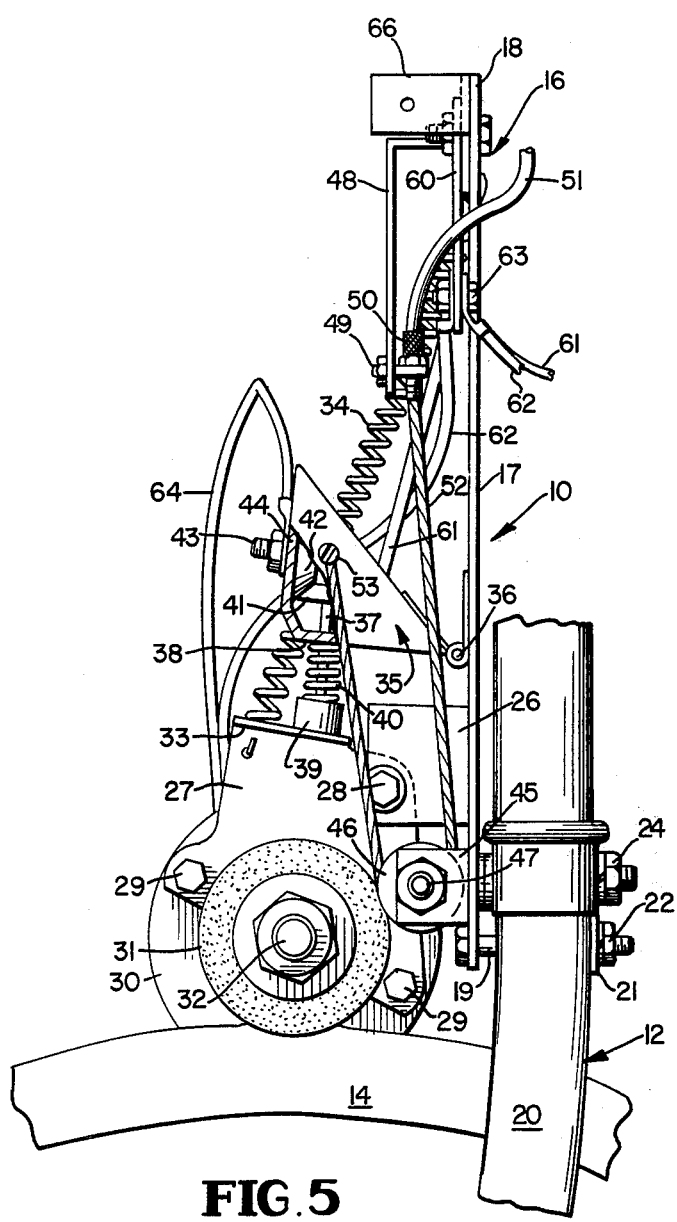
FIG. 5 is a view similar to FIG. 4 but illustrating a third position of certain parts of the assist unit and including certain parts of the vehicle on which the unit is supported.
Figure 6:
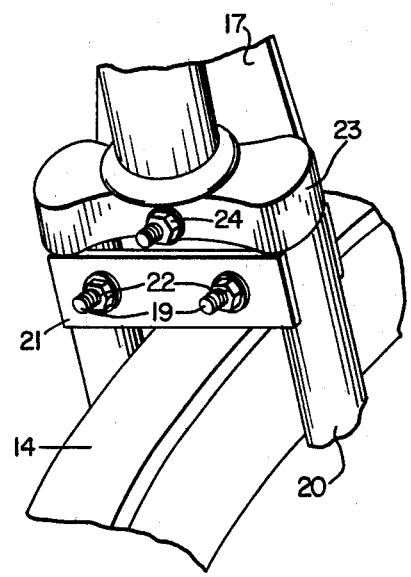
FIG. 6 is a fragmentary rear perspective view of the upper portion of the front wheel fork illustrating one means of mounting the assist unit thereon.

The electrically driven assist unit 10 includes a substantially T-shaped frame 16 consisting of a relatively wide rigid upright portion 17 and a narrower top cross piece 18. As seen in FIGS. 5 and 6, two bolts 19 extend through the upright portion 17, near its lower end, then pass between the arms 20 of the fork 12, and then through a bar 21 which extends across the back of the fork and bears against the back edges of the fork arms 20, as best seen in FIG. 6. Nuts 22 engage threaded rear ends of the bolts 19 and are tightened for securing the frame 16 to the fork 12, and in an upright position. The top cross member 23 of the fork of most modern bicycles is provided with an opening extending therethrough from front to rear. If such an opening exists, a nut and bolt fastening 24 is secured therethrough and through the upright 17 to provide a second clamp.

Figure 7:
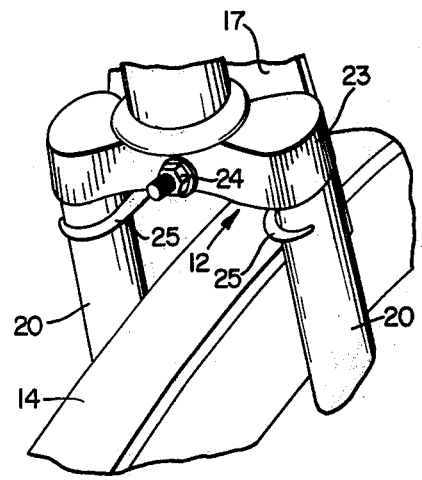
FIG. 7 is a similar view illustrating another mounting of the assist unit on the front wheel fork.
Figure 9:
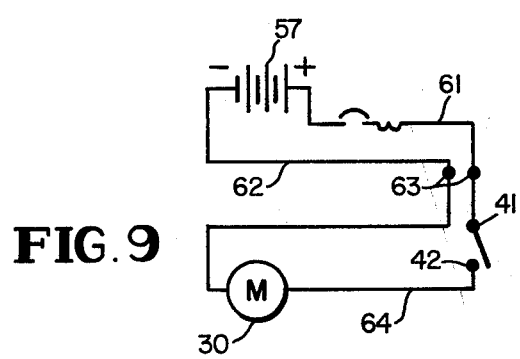
FIG. 9 is a diagrammatic view illustrating the electric circuit of the electrically driven assist unit.
Figure 8:
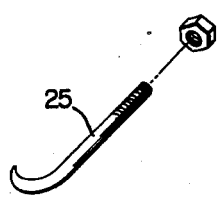
FIG. 8 is a perspective view of one of the fastenings shown in FIG. 7.

FIGS. 7 and 8 illustrate another means for clamping the frame 16 to the fork 12 and wherein hook-shaped bolts 25 are engaged around the rear edges of the fork arms 20 and extend forwardly between said fork arms and through the lower portion of the upright 17. The nuts 22 are then secured to the forward ends of the bolts 25 and tightened for clamping the frame 16 to the fork 12. The fastening 24 is also utilized if the fork head 23 has a bore extending from front to rear therethrough.

A block 26 is secured to and projects outwardly from the front side of the upright 17, near one side edge thereof and near the lower end of said upright. A plate 27 is pivotally mounted at 28 to the block 26, near an upper, inner corner of the plate and the lower portion of said plate is disposed against and is secured by fastenings 29 to the front end of the housing of an electric motor 30. A friction wheel 31 is secured to the shaft 32 of the motor 30 and is disposed over the top portion of the tire 14. The plate 27 has a top flange 33 which extends over the friction wheel 31 and toward the other side edge of the upright 17. One end of a contractile coiled spring 34 is connected to the plate 27 and the other end of said spring is connected to and supported by the crosshead 18. The spring 34 normally supports the plate 27, motor 30 and friction wheel 31 in their raised positions of FIGS. 2 and 3, with the friction wheel 31 out of engagement with the tire 14.

A switch housing 35 is swingably supported above and spaced from the flange 33 by a hinge 36, one leaf of which is secured to the front side of the upright 17. The other hinge leaf is secured to the top side of the housing 35. A push rod 37 extends slidably through a bottom wall 38 of the housing 35 and has a head 39 at its lower end which bears on the upper side of the flange 33. A compression spring 40 is mounted on the rod 37 between the head 39 and bottom wall 38 for urging the head 39 downwardly against the flange 33. A head 41, secured to the upper end of the rod 37, constitutes a movable switch contact. A similar contact 42 is secured by a fastening 43, a bolt of which is anchored to said contact, against the inner side of a front wall 44 of the housing 35.

An ear 45 projects outwardly from the upright 17, adjacent its lower end and at the other side edge thereof from the block 26. A pulley 46 is journaled on an unthreaded portion of the bolt of a nut and bolt fastening 47 which extends through said pulley and outwardly through the ear 45. A bracket 48 is supported by and depends from the front side of the crosshead 18 to receive a fastening unit 49 which supports an adjustable control cable assembly unit 50 in which is secured one end of a flexible tubing 51, through which a control cable 52 slidably extends. An exposed end of the control cable 52 projects downwardly from the assembly 50, around the underside of the pulley 46 and then upwardly to where its terminal is secured to a side wall of the housing 35, at 53. The tubing 51 extends from the unit 50 upwardly and then across a portion of the handlebar 15 to a bracket 54, to which one end of a lever 55 is pivotally connected. The cable 52 extends through the tubing 51 and connects with said lever 55. The parts 54, 55 are conventionally applied to modern bicycles having hand brakes. The lever 55 is disposed beneath one handgrip 56 of the handlebar 15 to be gripped with said handlebar grip for exerting a pull on the cable 52, in the same manner as a hand lever is manipulated for exerting a pull on the cable to apply a bicycle hand brake.

A conventional storage battery 57 is contained in a case 58 which is shown suspended from the top frame bar 59 of the bicycle 11. A bracket 60 of electrically insulating material is supported on and depends from the frame member 18. Two electrical conductors 61 and 62 lead from the battery 57 to posts 63 of the insulator 60. The conductor 62 extends from its post 63 to one terminal of the motor 30, and the conductor 61 leads from its post 63 to the contact 41. A conductor 64 extends from the other contact 42 to the other terminal of the motor 30.

Figure 2:
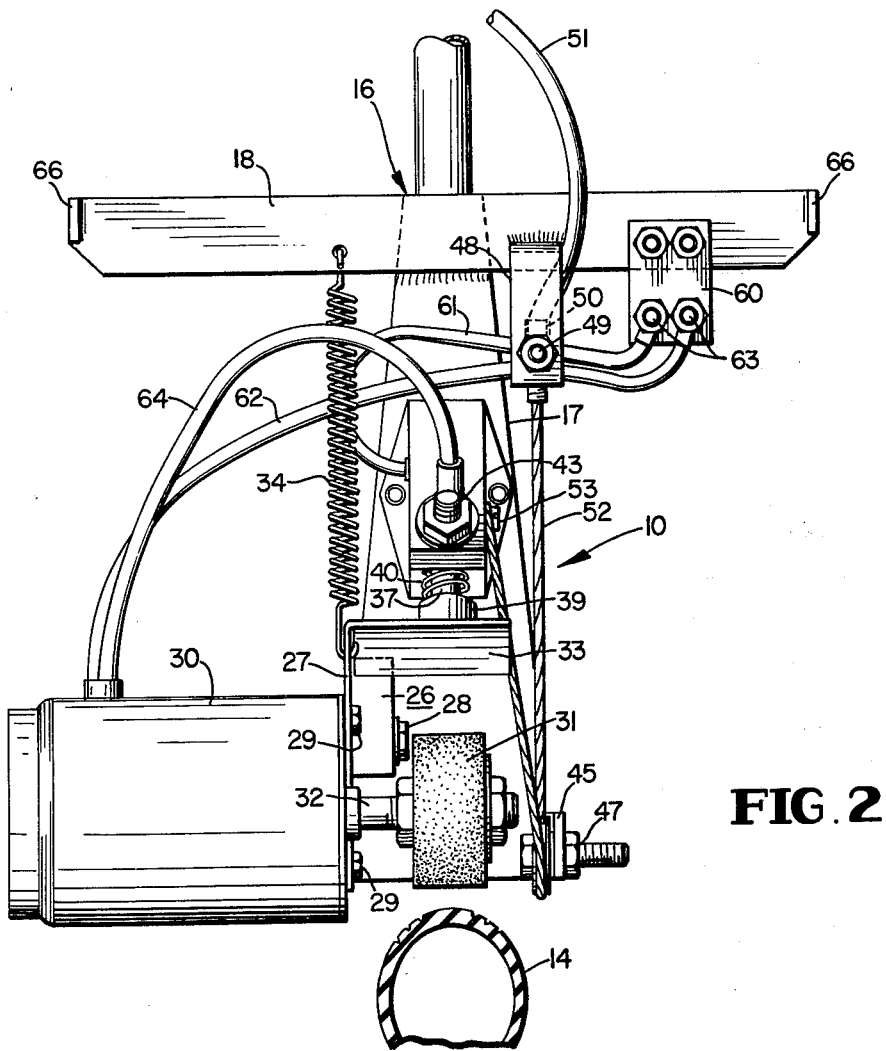
FIG. 2 is an enlarged front elevational view, partly broken away, with certain of the parts omitted.
Figure 3:
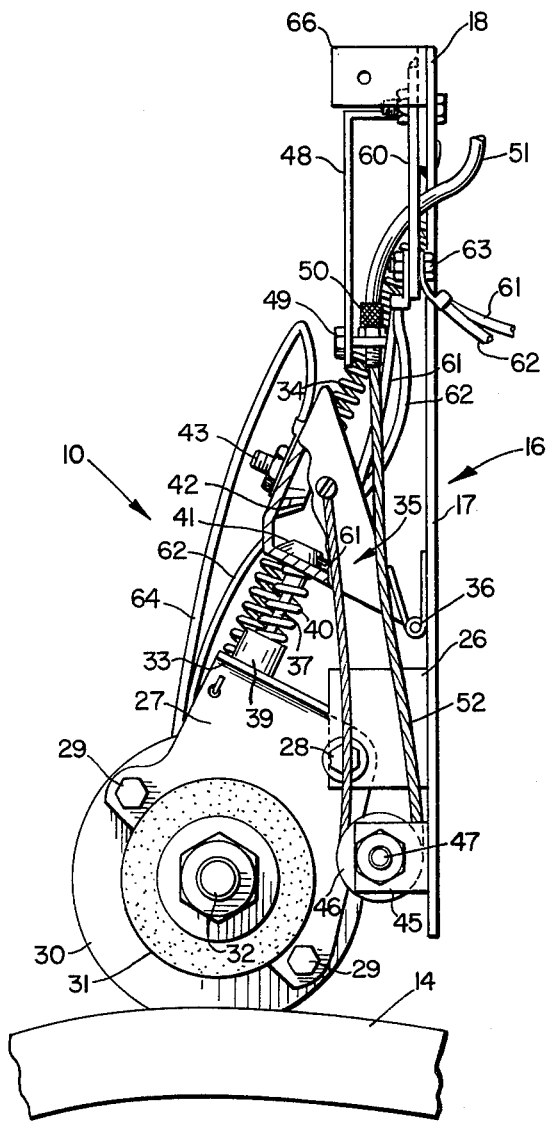
FIG. 3 is a side elevational view of the same parts of the assist unit as seen in FIG. 2.
Figure 4:
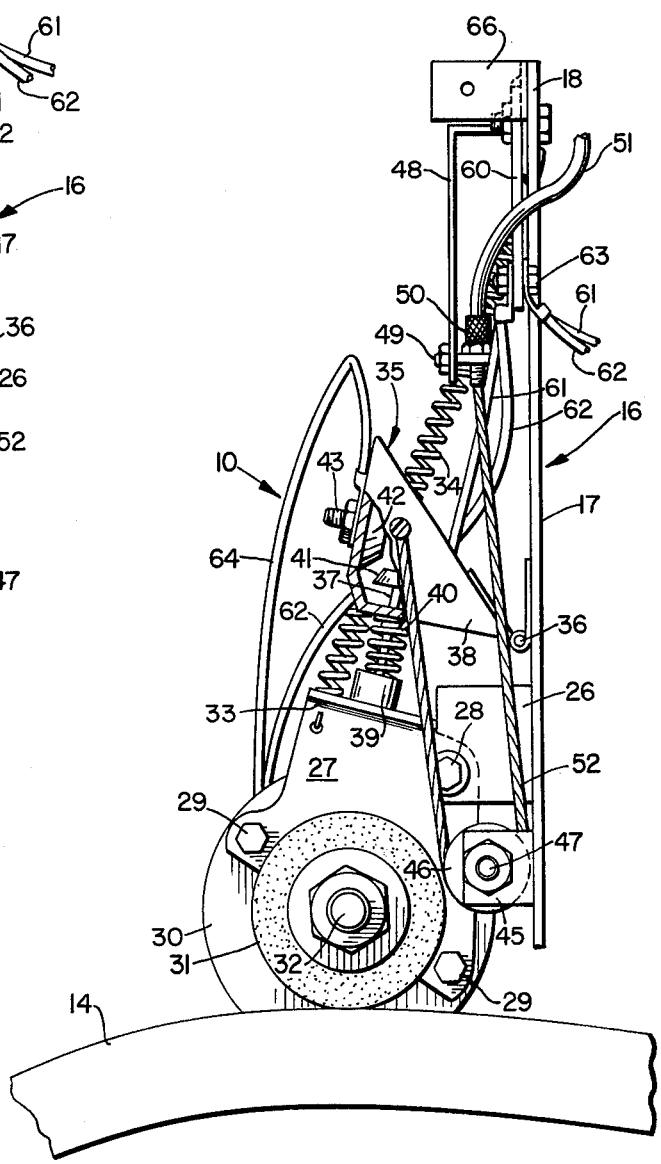
FIG. 4 is a view similar to FIG. 3 but illustrating a second position of certain parts of the unit.

When a squeezing pressure is applied to the lever 55 and grip 56 for rocking said lever toward the grip, a pulling force will be applied to the cable 52 for swinging the housing 35 downwardly from its position of FIGS. 2 and 3 to an intermediate position of FIG. 4 in which the friction wheel 31 is in contact with the tread of the tire 14. This is accomplished by the head 39 exerting a downward pressure on the flange 33 for swinging the plate 27, motor 30 and friction wheel 31 downwardly as the housing 35 swings downwardly. However, housing 35 swings through a greater arc than the plate 27 due to the fact that the rod 37 slides upwardly through the wall 38 as the spring 40 is compressed. When the friction wheel 31 has engaged the tire 14, as seen in FIG. 4, the contact 41 will be close to but out of engagement with the contact 42. Thereafter, as the housing 35 continues to swing downwardly to its position of FIG. 5, the spring 40 will be further compressed and the contact 41 will move into engagement with the contact 42 for completing the electric circuit to the motor 30 for driving the friction wheel 31 in a direction for rotating the wheel 13 in a counterclockwise direction as seen in FIG. 1, for propelling the bicycle in a forward direction. Friction wheel 31 will also be moved into tighter frictional engagement with the tire 14.

In order to disengage and render the unit 10 inoperative, it is merely necessary for the rider to release the lever 55. This will release the pulling force on the cable 52, so that the spring 40 can swing the housing 35 back to its position of FIG. 3 to disengage the contact 41 from the contact 42, for deenergizing the motor 30, as the spring 34 swings the plate 27, motor 30 and friction wheel 31 upwardly to their positions of FIG. 3.

A substantial part of the assist unit 10 may be covered by hood or cowl 65 having side edge portions at the top thereof which are disposed against ears or tabs 66 which extend outwardly from the ends of the crosshead 18, and to which the cowl 65 is secured by fastenings 67, FIG. 1. The bolt of the fastening 47 may extend through the lower portion of the cowl 65, and the nut of said fastening may be employed to clamp said lower cowl portion between said nut and the ear 45.

It will thus be apparent that by the same simple manual action as is employed for applying the hand brake of a bicycle, the electrically driven assist unit 10 can be rendered operative, and thereafter rendered inoperative by merely releasing the lever 55.

It will also be apparent that the unit 10 may be utilized on large tricycles and, if desired, battery container case 58 may be located in a basket mounted between the rear tricycle wheels.

Various other modifications and changes are contemplated and may be resorted to, without departing from the function or scope of the invention.

I claim as my invention:

1. An electrically driven assist unit for bicycles and tricycles comprising a supporting frame adapted to be secured to and supported by a front wheel fork, a motor support, means mounting said motor support on the frame for up and down movement, an electric motor secured to and supported by said motor support, a friction wheel secured to the shaft of said motor and disposed over the front wheel tire, a spring means normally retaining said motor support, motor and friction wheel in raised positions with said friction wheel out of engagement with the tire, a switch housing, means supporting the switch housing on said frame above the motor support for up and down movement, an electric switch contained in said switch housing and interposed in an electric circuit of the motor, yieldable means connected to a movable contact of said switch, said yieldable means being carried by the switch housing and bearing on the motor support for normally holding the switch housing in a raised position with said movable contact out of engagement with a stationary contact of the switch, and manually actuated means connected to the switch housing for moving the switch housing downwardly to cause said yieldable means to displace the motor support downwardly for engaging the friction wheel with the tire and for thereafter moving the movable contact into engagement with the stationary contact for closing the electric circuit to the motor.

2. An assist unit as in claim 1, said means mounting the motor support and said means supporting the switch housing providing swingable mountings for said motor support and switch housing.

3. An assist unit as in claim 2, said manually actuated means comprising a pulley rotatably mounted on a lower part of said frame, a cable trained under said pulley and having one end secured to the switch housing, a bracket adapted to be secured to a handgrip portion of the cycle handlebar, a lever swingably supported by said bracket and connected to the other end of said cable for exerting a pulling force on the last mentioned cable end when the lever is swung toward the handgrip.

4. An assist unit as in claim 3, and a flexible tubing having one end secured to said bracket and an opposite end secured to and supported by a part of the frame and through which a portion of said cable slidably extends.

5. An assist unit as in claim 3, said yieldable means being of sufficient strength to initially move the switch housing upwardly relative to the motor support, when a pulling force on the cable is released, for opening the switch before the friction wheel is raised out of engagement with the tire by said spring means.

6. An assist unit as in claim 1, clamp means engaging a lower portion of the frame and extending through the fork and bearing against rear portions of the fork arm for securing the frame to the fork.

7. An assist unit as in claim 1, said motor support comprising a plate against an outer side of which the motor is secured, said plate having a top flange projecting from an inner side thereof and disposed beneath and engaged by said yieldable means.

8. An assist unit as in claim 1, said yieldable means being of sufficient strength to cause the friction wheel to move downwardly and into engagement with the tire before said movable contact engages the stationary contact.

9. An assist unit as in claim 1, said frame being substantially T-shaped, and a cover detachably connected to said frame and disposed over a substantial part of the unit.

* * * * *